(12) United States Patent
Palmer (10) Patent No.: US 7,135,107 B2
(45) Date of Patent: Nov. 14, 2006

(54) APPARATUS AND SYSTEM FOR CONCENTRATING SLURRY SOLIDS

(76) Inventor: Robert M. Palmer, 5317 - 21A Avenue S.E., Calgary, Alberta (CA) T2B 2E9

( * ) Notice: Subject to any disclaimer, the term of this patent is extended or adjusted under 35 U.S.C. 154(b) by 11 days.

(21) Appl. No.: 10/810,593

(22) Filed: Mar. 29, 2004

(65) Prior Publication Data

US 2005/0194322 A1 Sep. 8, 2005

(30) Foreign Application Priority Data

Mar. 2, 2004 (CA) .................................. 2459261

(51) Int. Cl.
*B01D 21/01* (2006.01)
*B01D 21/08* (2006.01)

(52) U.S. Cl. ..................... 210/104; 210/96.1; 210/105; 210/110; 210/112; 210/143; 210/192; 210/207; 210/519; 210/522; 175/66

(58) Field of Classification Search ................ 210/207, 210/519, 521, 522
See application file for complete search history.

(56) References Cited

U.S. PATENT DOCUMENTS

| | | | | |
|---|---|---|---|---|
| 1,020,013 A | * | 3/1912 | Arbuckle | ..................... 210/521 |
| 2,413,375 A | * | 12/1946 | Pomeroy | ................. 366/182.4 |
| 2,756,965 A | | 7/1956 | Howe | |
| 3,067,878 A | * | 12/1962 | Genter et al. | ............... 210/802 |
| 3,087,890 A | * | 4/1963 | Pye | ............................. 210/712 |
| 3,227,278 A | * | 1/1966 | Johnson | ....................... 210/101 |
| 3,410,412 A | * | 11/1968 | Fechter | ....................... 210/143 |
| 3,523,889 A | * | 8/1970 | Eis | .............................. 210/713 |
| 3,532,218 A | * | 10/1970 | Dykhouse et al. | ........... 210/207 |
| 4,048,069 A | * | 9/1977 | Cuvillier et al. | ............ 210/801 |
| 4,599,117 A | | 7/1986 | Luxemburg | |
| 5,147,556 A | * | 9/1992 | Taylor | ......................... 210/712 |
| 5,173,195 A | * | 12/1992 | Wright et al. | ................ 210/802 |
| 5,601,704 A | * | 2/1997 | Salem et al. | ................... 210/86 |
| 5,814,230 A | | 9/1998 | Willis et al. | |
| 6,712,982 B1 | * | 3/2004 | Bohn et al. | .................. 210/802 |

FOREIGN PATENT DOCUMENTS

| | | |
|---|---|---|
| CA | 2099554 | 1/1995 |
| CA | 2219053 | 11/1997 |

* cited by examiner

*Primary Examiner*—Peter A. Hruskoci (57) ABSTRACT

An apparatus to separate solids from drilling slurry, having an inlet positioned over an outlet of a concentration tank to displace water that would otherwise enter the down-stream centrifuges. Baffles are provided to direct solids to the outlet and minimize the time that solids spend in the concentration tank. Fluids having solids removed therefrom are removed from the apparatus at a location remote from the outlet.

11 Claims, 8 Drawing Sheets

APPARATUS AND SYSTEM FOR CONCENTRATING SLURRY SOLIDS

FIELD OF THE INVENTION

The present invention relates generally to separating solids out of a liquid/solid mixture, and more particularly to methods and equipment for separating cuttings from drilling slurry.

BACKGROUND OF THE INVENTION

Canadian Patent 2,219,053 to Rowney ("'053") teaches that wells for oil, gas and the like are typically drilled by a rig that includes a hollow drill string with a bit at its lower end. As the drill string is rotated, drilling fluids are pumped down through a channel in the drill string. The drilling fluids pass through the bit and return to the surface (as a slurry) on the outside of the drill string, carrying cuttings to the surface where the drilling fluids are recovered and recycled. Water may be used as drilling fluid in shallow drilling, but in deeper wells drilling "muds" of various compositions are used. Cuttings and other undesired solids are separated from recovered drilling fluids before re-use of the drilling fluids. A known but expensive method for mechanically separating solids from drilling fluid, which is employed in '053, is to pass the slurry through a centrifuge. Due to the large volume of drilling fluid used in a typical drilling operation, it is necessary to have either a very large centrifuge or several smaller centrifuges when processing in the manner taught by '053. The capital and operational costs of processing slurry using a centrifuge-based system are significant because large capacity units are expensive and consume large quantities of electrical power, which power is not always available at drilling sites. '053 also teaches baffles used in the traditional manner (to interrupt and slow the movement of slurry) installed in an elongate "settling tank" having a large open trough and auger extending substantially its entire length along the bottom of the tank; disadvantageously, the relatively large opening and the mixing action of the auger of '053 tend to allow access by substantial amounts of water from the tank to the solids outlet as well as agitating the solids and blending them with further excess water. The failure to prevent or reduce the amount of water reaching the centrifuges causes a relatively low efficiency due to excess water circulating through the centrifuges reducing the mass of solids being processed during a period of operation.

Known slurry processing technologies employ a variety of means to extend the path length between the tank inlet and solids outlet in order to permit separation by permitting solids to passively settle to the tank bottom. Various sloping surfaces are employed to resist the passively separated solids sticking to the inside of the tank. Disadvantageously, this passive distribution of solids permits substantial water to be drawn from the settling tank into the centrifuge where power is consumed in mechanically separating excess water from solids.

Other prior art relating to separating drilling fluid from slurry is based on flat bottom settling tanks having several chambers separated by baffles that extend to the bottom of tank. Openings are provided in the bottom or top of those baffles to limit flow between chambers while permitting a weiring effect that extends residence time and mechanically enhances the precipitation of solids from liquids. Disadvantageously, this design is limiting in its throughput and necessitates the use of devices for removing solids from the tanks. Conventional baffles force the slurry to follow an extended path needed for the precipitation of untreated solids from solution. Relatively large outlets in the bottom of such tanks are used to remove the settled solids. Disadvantageously, the larger the outlet the more difficult it is to prevent the liquids from entering the solids outlet. Further, to maintain the physical concentration ratios of flocculant to entrained solids when slurry is pre-treated with a flocculating agent, many such systems unintentionally re-circulate water that has already had solids removed, thereby wastefully processing the same volumes of water more than once.

Other prior art better suited to higher throughput of treated slurry is based on sloping bottom tanks of different configurations. For example, U.S. Pat. No. 4,599,117 teaches a 'v'-shaped tank with fixed tubes rather than baffles. U.S. Pat. No. 5,814,230 teaches a conical tank having a mixer instead of baffles to promote contact between flocculant and slurry. CA 2,756,965 ("'965") teaches a conical tank having overflow means for allowing lighter material to escape the tank but having no baffles because it relies on water flow counter-current to slurry direction to prevent the buildup of solids on the sloping walls of the conical tank. Disadvantageously, these designs rely on separation occurring within the tank and use baffles in the traditional manner for separation.

CA 2,099,554 to Kallis ("'554") teaches a transportable cone-shaped tank having a tangential input mid-way between a cylindrical upper and a conical lower section. The fluid outlet of '554 is at the top of the tank using a bowl collector to drain off clean water, but which bowl disadvantageously interferes with access to interior portions of the tank such that no baffles are employed inside the tank. '554 teaches "specially designed and located input and output pipes" and slurry is pumped through a hose into a circular input pipe (called a "centrifuge" pipe) that wraps around the interior of the tank and has slots along its bottom edge to permit solids and fluids to exit into the body of the settling tank. The input pipe of '554 distributes slurry around the tank and extends the time for solids to separate from liquids. By using a tank having a conical base '554 collects solids above a solids outlet having a relatively small area, thereby displacing liquids from direct access to said solids outlet. Disadvantageously the mass of solids so collected passively settles across the conical space coming to rest above the solids outlet. In these circumstances the force compressing the body solids then passing through the plane of the solids outlet is nothing more than the weight resulting from the stationary mass settled into the conical space above the outlet. Consequently, any concentration in these settling tanks is merely incidental to the collection of solids during separation. Although superior to many designs, both '554 and '965 in steady-state operation still allow excess water to reach the centrifuges. Moreover, '554 teaches a valve to block the bottom of the tank in order to permit solids to settle out of solution for periodic removal from the tank. And '965 teaches a jet tube in the conduit connected to the solids outlet to add water to dilute the solids.

Most known means for the conventional processing of drilling slurry are based on settling tanks having baffles (i.e. primary mechanical separators) that act mechanically (like rocks in a stream) to enhance precipitation of solids from fluids (in some cases chemically enhanced). The baffles extend the time that the slurry blend remains inside the tank by extending the length of the path between the inlet and outlet of a settling tank, however the effectiveness of such separation drops as the slurry processing rate increases beyond the capacity of mechanical separators. Consequently, a second stage of separation was appropriate, and when drilling companies were permitted to use local water supplies without restriction, a number of separation system designs solved the problem of insufficient primary separation by adding high-capacity centrifuges in series with the settling tank, requiring substantial electrical power to remove residual water. The high cost of maintaining electrical power and an adequate supply of clean water on a well-site causes the recovery and reuse of drilling water, using minimal power, to be an important objective. Consequently, it is desirable to minimize residual water in the cuttings in order to minimize water reaching the centrifuges (i.e. secondary mechanical separators).

SUMMARY OF THE INVENTION

In order to overcome the shortcomings of the prior art, in one broad aspect the present invention comprises a method which comprises addition of a flocculating agent to a slurry stream enroute to the apparatus of the present invention so as to form agglomerated solids, and the apparatus then guides or propels the agglomerated solids directly towards an outlet in the apparatus in a manner that concentrates the solids over the solids outlet—in order to both send a more dense mass of solids to the centrifuges and block separated fluids from ever reaching the centrifuges, thereby separating the agglomerated solids/cuttings from the slurry.

Accordingly, in a first broad aspect of the present invention, there is provided a method for removing solids from a slurry stream comprising fluids and entrained solids, the method comprising the steps of:

i) adding a flocculating agent to agglomerate to said solids so as to form agglomerated solids within said slurry stream;

ii) introducing said slurry stream having said agglomerated solids and said fluids therein through an inlet to a vessel having an outlet that is below and substantially co-axial with said inlet;

iii) directing said agglomerated solids through a guiding member which guides said agglomerated solids to said outlet;

iv) forming and maintaining a substantially conical mass of agglomerated solids substantially co-axial with and over said outlet, thereby upwardly displacing said fluids;

v) withdrawing said agglomerated solids from said mass of agglomerated solids via said outlet; and vi) removing said fluids from said vessel from a location remote from said outlet.

According to a second aspect of the present invention there is provided an apparatus for removing solids from a slurry stream comprising fluids and agglomerated solids, the apparatus comprising:

a tank having a peripheral wall and a bottom, an inlet for supplying said slurry stream to said tank, and an outlet fluidly coupled to said bottom substantially co-axial with and below said inlet;

guiding means substantially co-axial with but positioned above said outlet and between said inlet and said outlet, to form and maintain a substantially conical mass of agglomerated solids substantially co-axial with and over said outlet; and fluid removal means for removing said fluids from said tank from a location remote from said outlet.

According to a third aspect of the present invention there is provided a system for removing solids from a slurry stream comprising fluids and entrained solids, the system comprising:

agglomeration means for agglomerating a flocculant to said solids entrained within said slurry stream;

inlet means for introducing said slurry stream to a solids concentrating apparatus, said apparatus comprising:

a tank having a peripheral wall, a bottom, and an outlet fluidly coupled to said bottom substantially co-axial with and below said inlet means;

guiding means substantially co-axial with but positioned above said outlet and between said inlet means and said outlet, to form and maintain a substantially conical mass of agglomerated solids substantially co-axial with and over said outlet; and drain means for removing said fluids from said tank;

sensor means for detecting the amount of each of said agglomerated solids and said fluids in said tank;

solids removal means coupled to said outlet, for withdrawing said agglomerated solids through said outlet; and separation means fluidly coupled to said solids removal means, for separating residual water from said agglomerated solids withdrawn through said outlet.

In exemplary embodiments of the method of the present invention, the method preferably comprises the step of centrifuging said withdrawn agglomerated solids to separate any residual fluids therefrom. In preferred methods, said introducing comprises propelling said agglomerated solids and said fluids, most preferably by pump pressure. The said directing preferably comprises aiming said slurry stream at said guiding member, said guiding member preferably comprising a substantially vertical conduit coaxial with and suspended above said outlet, and removing said fluids is preferably accomplished by means of drainage.

In exemplary embodiments of the apparatus of the present invention, said bottom is substantially conical with said outlet centrally disposed therein, said inlet means comprises means for directing said slurry stream through said inlet into said tank, said mass of agglomerated solids is substantially conical, and said fluid removal means preferably comprises a drain. Said guiding means preferably comprise a baffle assembly suspended in said tank, and said baffle assembly is preferably moveable, for adjusting the position of said baffle assembly within said tank, and most preferably comprising means for moving said baffle assembly. The said baffle assembly preferably comprises a plurality of concentric baffle members that partition said tank into a plurality of fluidly coupled chambers.

In exemplary embodiments of the system of the present invention, the system further comprises control means, said control means receiving input from said sensor means and regulating volumetric flow of slurry into said tank via said inlet means and/or volumetric flow of fluids out of said tank via said drain means. The agglomeration means preferably comprise tanks containing flocculating agent, and the system preferably further comprises flocculant generation means fluidly coupled to said drain means for mixing removed fluid with flocculating agent to create flocculant, and flocculant transfer means fluidly coupled to said flocculant generation means at a point upstream of said solids concentrating apparatus for introducing said flocculant into a conduit carrying said slurry stream to said inlet means.

A discussion of some advantages of preferred embodiments follows.

A novel apparatus, being a conical tank having an inlet above and substantially co-axial with a solids outlet below, is used to create and maintain a "plug" that is a concentrated mass of solids over the solids outlet to minimize water escaping through the solids outlet once the system of the invention reaches steady-state operation. Concentration results directly from the increased pressure of a moving mass of solids accelerating (either propelled or in free-fall)

towards the solids outlet from the inlet. Concentration is enhanced by using a conduit that maintains a stack of solids over top of the solids outlet. The conduit (that is typically cylindrical but may be of any cross-sectional shape) advantageously acts secondarily as a baffle member providing residual separation if required. The combined effect of pushing the components separated from the slurry towards the outlet and stacking the solids in a substantially conical body above the outlet (enhancing the static head), is to deliver a more dense mass of solids to the centrifuges while displacing fluids upwards where the fluids may be drained out, skimmed off, or sucked away from the tank without ever reaching the centrifuges.

The prior art teaches away from aiming the stream of separated solids and fluids directly at the solids outlet, which aiming results in the efficiencies of the present solution. The prior art teaches extending residence time in a settling tank using a series of baffle members primarily as baffles that interrupt the movement of blended fluids and solids for the purpose of mechanically separating solids from fluids, disadvantageously distributing the solids along the bottom of the settling tank. Instead, the apparatus of the present invention includes novel baffle members that each act secondarily as a baffle, but primarily as a chute or sluice that channel solids towards the outlet and restrict the spread or distribution of the cone of solids away from the outlet. The power consumption efficiency of the present solution arises in the related advantages that less water reaches the centrifuges and more dense solids are processed by those centrifuges.

Further, using process automation not contemplated in any prior art, according to the method of the present invention once the system reaches steady-state—having a mass of intentionally concentrated solids displacing water from the outlet—movement of solids through the system may be optimized by balancing the outflows with the separated slurry inflow and chemical consumption. Incremental adjustments may be made continuously by a programmable logic controller that monitors tank levels, water clarity, and mass transfer. With an adequate supply of slurry and flocculating chemical to form agglomerated solids within the slurry stream (by the time the slurry stream reaches the inlet) there is a substantial range of operational level that is tolerable in the tank, which allows time for the incremental adjustments to flow rates and chemical injection to correct conditions ensuring that separated fluid flowing, skimming, or pumping out the drain remains clean and system operation is not interrupted. As a result of such continuous refinement the mass flow rate through the system increases to the point where the tank becomes more akin to a conduit functionally—having no settling purpose and minimal residence time.

A plugging stack forms from inflowing solids like a large crowd running for a small exit from a stadium—agglomerated solids accumulate proximate the outlet of the tank. Like handrails leading through the turnstiles of a stadium entrance the conduit formed by the concentric baffles guides and restrains those solids from dissipating away from that outlet. The baffles are used mainly to promote stacking the solids in a conical mass causing compression of the lowermost solids by those solids uppermost in the mass, which ensures that a relatively concentrated mass of solids is being sent to the centrifuges. At steady-state (i.e. once the plugging stack forms) the solids mass remains substantially constant with solids entering the tank substantially equal to solids exiting, and the fluids level experiencing minor fluctuations. Advantageously, a higher average system capacity is achieved, together with reduced utilization of fresh water, flocculating chemical, and centrifuges.

The system of the present invention reduces flocculant consumption, fresh water consumption, and centrifuge (per unit power input) capacity requirements in the recovery of water from treated slurry. By introducing flocculating agent into untreated slurry considerably upstream of the concentrating (tank) apparatus and incrementally adjusting the quantity of such agent, the waste of both power and agent is avoided, and flocculant residence time in the slurry is increased—resulting in the more effective use of agent and better agglomeration of the flocculant to the solid cuttings in the slurry stream flowing into the apparatus. Actively directing those separated solids towards the outlet of the apparatus increases the ratio of solids to fluids proximal the apparatus outlet to downstream centrifuges. With this higher concentration of solids, less fluid reaches the centrifuges such that lower-capacity centrifuges are required to process a given volume of slurry and less power is consumed, thereby also reducing both capital and operational costs. The agglomerated solids dropping rapidly towards the outlet at the bottom of the concentrating apparatus displace fluids near said outlet and cause fluid to rise towards skimmers such that (once the system reaches steady-state operation) most of the fluids exit via an upper level drain or skimmer rather than the lower level outlet leading to the centrifuges.

Whereas conventional settling tank technology teaches extending the residence time of both the agent in the slurry and the slurry in the tank (e.g. by causing solids following a serpentine path to drop onto an auger along an extended outlet that permits significant amounts of fluid to enter the centrifuges, requiring additional capacity and power to remove that fluid), the method and system of the present invention do achieve extended residence time of agent in the slurry by introducing the flocculant further upstream, and minimize the residence time of solids in the concentrating apparatus. Directing pre-agglomerated solids to a relatively more restricted outlet that resists excess fluid reaching the centrifuges permits the centrifuges to be used more efficiently because the fluids are displaced from that outlet and there are alternate means for removing those fluids. Upon system startup there is a transition period during which a combination of solids and excess fluids pass through the bottom outlet until the separated solids displace the fluids to a higher level remote from the outlet. Once the system reaches steady state, the upper drain works in combination with a substantially balanced inflow and outflow that permits the accumulation of solids above the bottom outlet. This accumulation over the outlet allows the arriving solids to displace fluids to the upper drain before they are sucked through the bottom outlet. A convex mound of solids tends to accumulate over the outlet, which permits the continuous settling of solids on top of solids to further enhance the concentration of solids that reach the centrifuges. Operating the centrifuges at a rate exceeding the inflow would eventually result in the disadvantageous depletion of accumulated solids and permit fluids to reach the outlet.

Since many drilling operations take place during the winter and water is an important drilling fluid or component of such drilling fluid, freezing can be a serious problem for separators. Consequently, when there is an insufficient supply of slurry to the system of the present invention, water may be circulated through the solids outlet intentionally (returning sufficient water from the centrifuges directly to the concentration tank) to keep the conduit, pumps and centrifuges from freezing. After which, as the flow of slurry available for processing returns to full capacity, there is a transition period during which a combination of solids and excess water pass through the solids outlet until the separated solids displace water to a higher level remote from the outlet and the system reacquires its steady-state balance with minimal residual water reaching the outlet.

Similarly, when there is insufficient flocculant being injected to agglomerate onto suspended solids and thereby separate the incoming stream into solids and fluids, there is a risk of contamination of the drain fluids such that it is appropriate to interrupt drainage while the condition causing the lack of flocculant is corrected. During this period it is possible for separation to continue, but the system's centrifuges or other mechanical separators will have to work harder because more fluids will escape through the solids outlet. Instead, typically the system will be operated in a re-circulation mode by reducing the inflows and allowing relatively dirty fluids returning from the centrifuge to pass through the outlet with solids until pre-flocculation recovers. Higher than normal levels of solids in the drain fluids or returning fluids are detectable using sensors that trigger the controller to change to re-circulation mode, or bypass or shut-off the system entirely until flocculation returns to normal. It is contemplated that drain fluid holding tanks or a parallel separation system may be engaged to avoid drilling or processing down time.

On normal startup and using water as the drilling fluid, the system of the present invention is filled with clean water and the centrifuges are running to remove any remaining water from the tank solids outlet flow. The moveable baffle assembly is positioned at a startup level, typically low in the tank, to prevent lateral spreading of solids entering the tank and thereby facilitates the buildup of a mass of solids proximal the outlet after the slurry and flocculant supply are engaged and agglomerated solids and fluids commence flowing into the central chamber created by the baffle assembly. As the input flow flocculant/slurry ratios are balanced for the particular slurry, solids begin to accumulate to a depth sufficient to cause water to be displaced upward thus preventing such water reaching the solids outlet. The baffle assembly may then be raised sufficiently to allow the mass of solids to spread laterally to the bottom of chambers adjacent to the central chamber. Baffle position and flow adjustments are incrementally refined until equilibrium is attained respecting the level inside the tank. Flocculant/slurry ratios commonly change due to cutting/slurry ratio changes, even within a single formation; however the range of adjustability permits the system of the present invention to operate more efficiently than any known system for extended periods of time with minimal rig down time.

Polyacrylamide is a good example of flocculating agent suitable for use with the apparatus of the present invention. Polyacrylamide may be used to agglomerate particulate solids such as cuttings in a slurry stream in order to: accelerate settling rate of solids (clarify) from solution; increase solids density (thickeners, dissolved air flotation); and facilitate mechanical dewatering of solids (e.g. via centrifuges, belt presses, screw presses). In testing, a wide range of flocculants are successful in operating the system of the present invention, however the chemical balance of flocculating agent in the particular slurry composition becomes important to sufficiently separate solids from fluids by the time they reach the inlet, such that focussing the inflowing pre-treated stream on the tank bottom and outlet has the desired effect of concentrating solids prior to entering the centrifuges. Consequently, automated control systems based on various sensing technologies are an appropriate enhancement to optimize system throughput relative to that achievable by a human operator who is continually macro-adjusting flow rates in response to changes in the slurry arising from differences in the composition of the formation at different drilling sites and depths. Further suiting the system of the present invention to automated use with PLCs, it relies on positive displacement pumps (rather than conventional centrifugal water pumps) to refine control over the ratio of chemical to slurry, when blending chemical with slurry, which also achieves more thorough mixing and complete usage (i.e. less waste) of the chemical.

Advantageously, relative to known separation systems, the mass flow rate per square centimeter of solids outlet area of the apparatus of the present invention is very high, such that a higher system capacity results and less waste occurs due in part to less re-circulation of clean fluids under normal operating conditions at steady-state. As long as the friction along the inclined bottom of the concentration tank is sufficiently matched to the viscosity of the particular body (different formations having different compositions) of solids being processed, then the capacity of the tank is not critical—since the inflows and outflows can be balanced to permit the outlet area (meters$^2$) to suffice for the available tank capacity (meters$^3$) once the terminal velocity of the solids flow is implicitly taken into account by the adjustments available. As fluids are pre-separated and solids are more efficiently transferred to the centrifuges to extract residual moisture, the capacity of the resulting system increases substantially with the fluids being skimmed off at a higher rate simultaneous with the concentrated solids being sucked out the bottom of the tank bearing less fluid. Importantly, the separated water can be immediately recycled from a drain skimmer into the flocculant mixing subsystem where it is typically mixed with dry chemical crystals to create a supply of fluid flocculant that is injected into the inflowing stream of raw slurry an appropriate distance upstream of the concentration tank inlet. This recycling of separated water substantially reduces the need for fresh feedwater to be available on site.

The system and method of the present invention immediately directs the slurry towards the tank outlet in order to minimize the time that solids spend in the concentration tank. In order to overcome the disadvantages of the prior art it became important to concentrate the separated solids over the tank outlet to displace water from entering the centrifuges. Advantageously, using baffles to aggressively direct solids to the outlet and minimize the time that solids spend in the concentration tank, a higher average system capacity is achieved, together with reduced utilization of fresh water, flocculating chemical, and centrifuges.

A detailed description of an exemplary embodiment of the present invention is given in the following. It is to be understood, however, that the invention is not to be construed as limited to this embodiment.

BRIEF DESCRIPTION OF THE DRAWINGS

In the accompanying drawings, which illustrate exemplary embodiments of the present invention.

DETAILED DESCRIPTION OF PREFERRED EMBODIMENTS

Reference is now made in detail to FIGS. 1–8, in which identical reference numbers identify similar components.

Referring now to FIGS. 1–5, there is illustrated a preferred embodiment of an apparatus denoted generally as 100 comprising a concentration tank 110 having an inlet 115, sidewalls 116, a conical base 117, an outlet 118, baffles 120, chambers 121, fluid return 140, exit conduit 150, and at least one skimmer or drain 160. On start-up, apparatus 100 is filled with water (not shown) and centrifuges (not shown) may be operated to create suction at outlet 118. A stream of pre-flocculated slurry 135 enters tank 110 from conduit 130 through inlet 115 directly into central chamber 125 where the slurry drops towards bottom space 127 of tank 110 at a volume per unit time sufficient to fill outlet 118 and then backup along annular passage 126 until tank 110 is substantially filled with slurry displacing the water with which it was filled on start-up. In the course of displacing said water, after slurry fills annular passage 126 it rises in central chamber 125 and all chambers 121—causing water floating on top of separated solids to exit tank 110 via drain 160. As a result of the presence of baffles 120 the profile 210 of solids level 211 will tend to be higher in central chamber 125 as compared to chambers 121 at increasing radial distances from central chamber 125. Whether controlled automatically using a level detector 161 (e.g. Milltronics Multiranger Plus™ ultrasonic device) or manually by a human operator (not shown) monitoring the level of slurry in tank 110, adjusting the flow rate of said stream of pre-flocculated slurry 135 is one way to ensure that clean water 136 (not solids) flows out via drain 160. Adjusting the centrifuge suction at outlet 118, is an alternate or additional means by which to maintain the solids level 211 in tank 110 below the level of drain 160.

Figure 1:
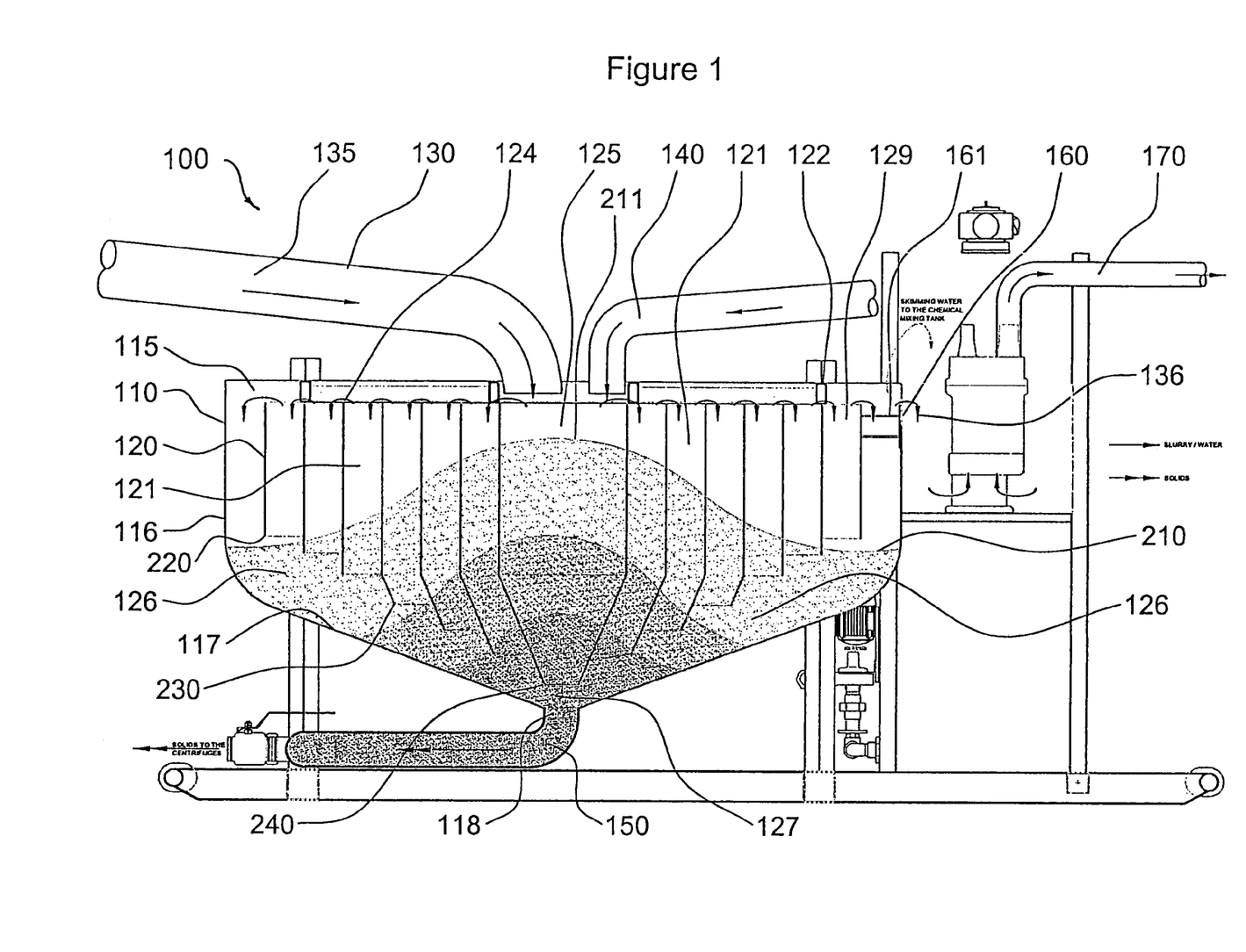
FIG. 1 is a cut-away side elevation view of one embodiment of the apparatus of the present invention.
Figure 2:
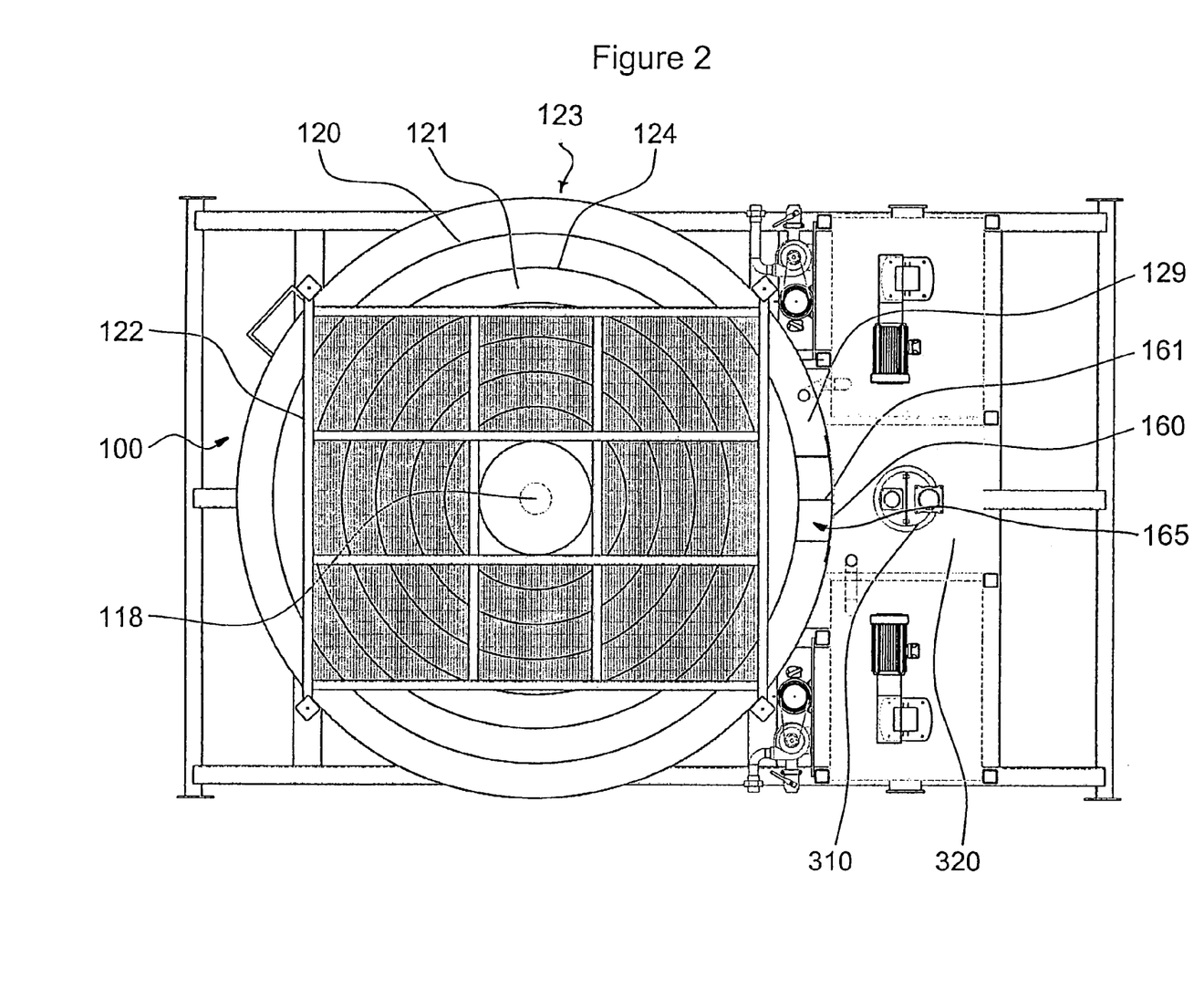
FIG. 2 is a top plan view of one embodiment of the apparatus of the present invention.

Referring to FIG. 2, baffles 120 may be connected to a common frame 122 forming a baffle assembly 123 that is easily moved (manually, or by hydraulic, pneumatic, electric or other suitable drive means) in any direction. According to one embodiment, baffle assembly 123 is moved vertically into and out of tank 110 decreasing and increasing respectively annular space 126 and at bottom space 127 between baffles 120 and outlet 118. By moving baffle assembly 123 deeper into tank 110 the tops 124 of baffles 120 drop below the water surface level and the flow of solids along sloping bottom 117 is constrained such that the residence time of solids in tank 110 tends to increase, particularly if the inflow of slurry 135 and centrifuge suction are reduced to maintain slurry level 210. As baffle assembly 123 is raised the tops 124 of baffles 120 appear at or slightly above the water surface level creating a "weir" over which surface water moving to drain 160 must pass. Consequently, facilitated by mechanical interaction with tops 124, water carrying "pin floc" (namely agglomerated solids) tends to surrender any light-weight, small particles or grains of solid still suspended therein. With baffle assembly 123 in such raised position the flow of solids along sloping bottom 117 is enhanced and the residence time of solids in tank 110 tends to decrease, permitting solids to be sucked through outlet 118 at a greater rate. Consistent with the raised position of baffle assembly 123 and the higher flow rate of solids, there tends to be a deeper accumulation of water above the solids in chambers 121. It is contemplated that with conduit 130 positioned above central chamber 125 (as shown in FIG. 1) the ratio of water to solids will be lowest in central chamber 125 and will increase across each of chambers 121 towards the perimeter of tank 110 such that the ratio of water to solids is highest in the outermost chamber 121 proximal drain 160 where the water quality tends also to be highest since the time to complete separation of solids from fluids will be the greatest at the perimeter. Operating apparatus 100 with baffle assembly 123 raised to a level above the level of drain 160 may lead to contamination of drain water stream 165. Consequently, according to a preferred embodiment of apparatus 100 there will further be provided shut-off means (not shown) for preventing the continued inflow of said stream of pre-flocculated slurry 135 while the tops 124 of baffles 120 in baffle assembly 123 rise and remain above the level of drain 160. In the embodiment according to which baffle assembly 123 is movable there will further be provided a baffle position sensor (not shown) that communicates with a system controller in cooperation with level detection means 161 to trigger the termination of inflowing slurry 135 and may (after a suitable time delay) also terminate suction at outlet 118.

Figure 3:
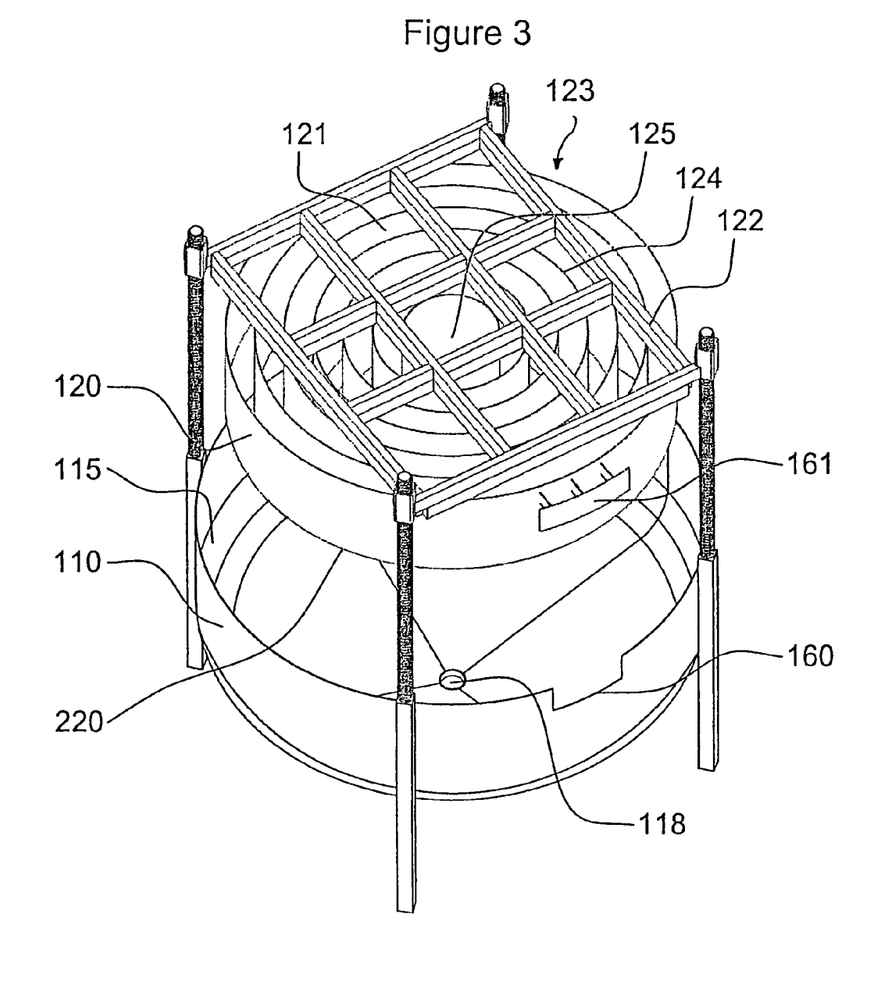
FIG. 3 is an isometric view from above of one embodiment of the apparatus of the present invention.
Figure 4:
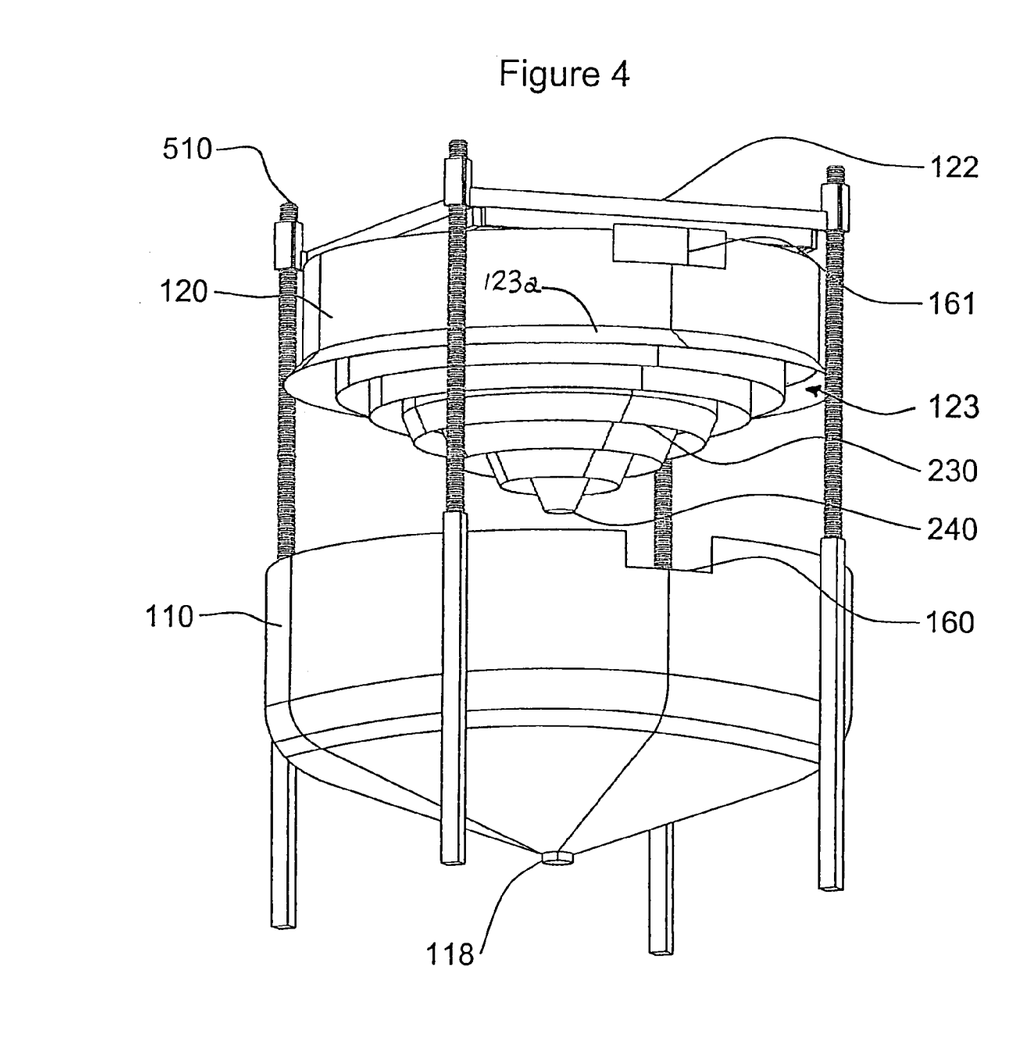
FIG. 4 is an isometric view from below of one embodiment of the apparatus of the present invention.

Referring to FIGS. 3 and 4, baffle assembly 123 is shown raised out of tank 110 for cleaning, service, and other purposes. Elongate members 510 may be used to adjust the position of frame 122 by acting as mere guides that restrict the movement of the baffle assembly which may be raised and lowered by independent means connected to lifting points (not shown) on frame 122. Members 510 may instead be hydraulic rams or threaded worm gear electrically driven extensible and retractable components that are integrated in apparatus 100 permitting the system of the present invention to fine-tune itself by having self-propelled members 510 tied into the PLC coordinating the rest of the elements of said system.

It is further contemplated that retractable and extensible baffle members 120 may be used on one or more rings within baffle assembly 123 in order to permit fine control of the depth and shape of annular passage 126 below baffle assembly 123 during periods in which it is desirable to maintain frame 122 and baffle assembly 123 in a fixed position.

Figure 5:
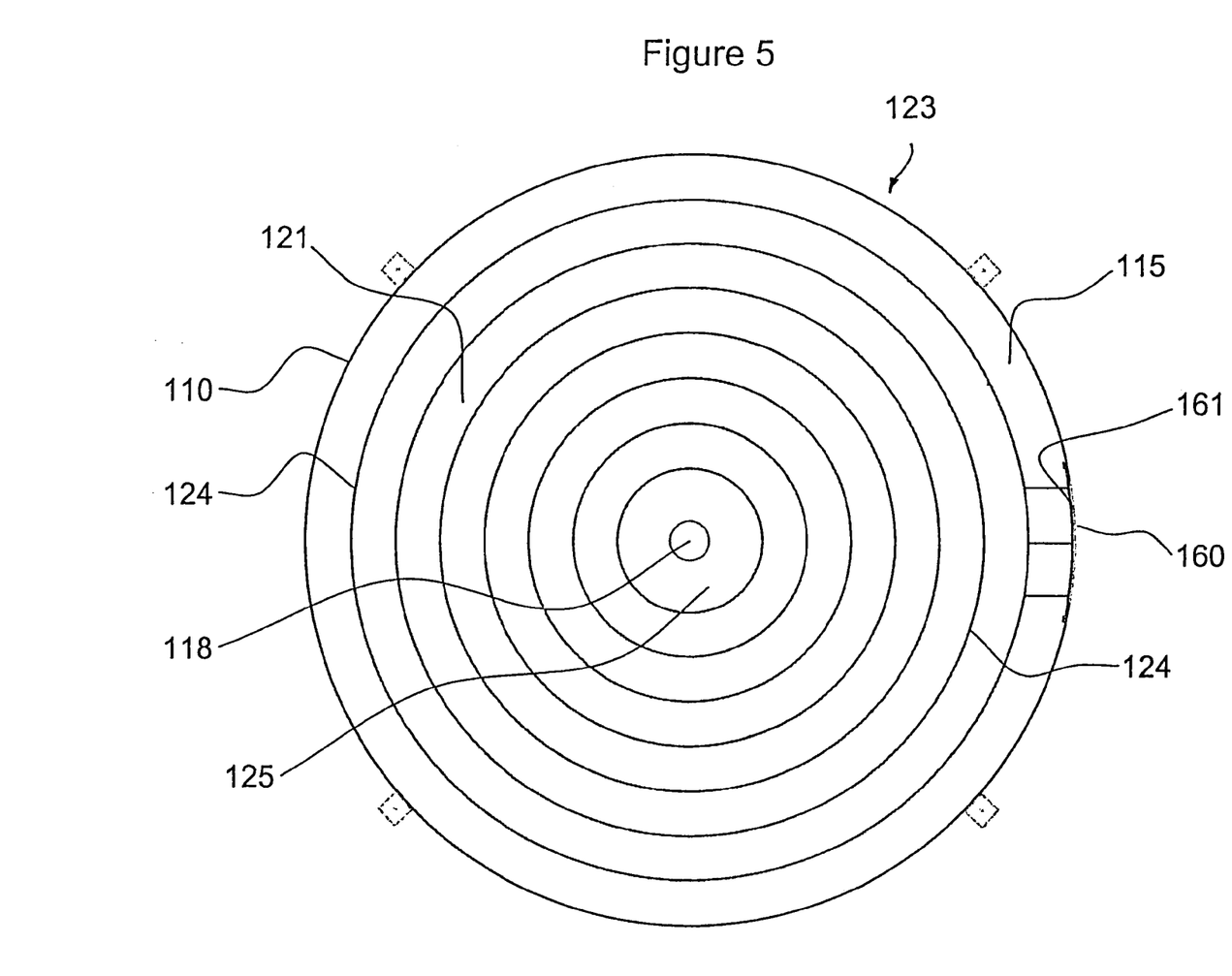
FIG. 5 is a top plan view of one embodiment of the baffle assembly of the present invention in which baffles are arranged concentrically.

Referring to FIG. 5, baffle assembly 123 is shown as a series of independent concentric ring baffles connected by a common frame 122.

Referring still to the preferred embodiment illustrated in FIGS. 1–5, a novel method of controlling said solids level 211 includes adjusting the position of baffles 120 in a manner that causes annular passage 126 to be more or less restricted according to whether it is desirable to have less or more (per unit time) separated solids slide down the sloping bottom 117 to outlet 118. According to one embodiment of baffle assembly 123 the outer baffle ring bottom 220 is substantially vertical allowing the level of fluids and solids in the outer chamber to fluctuate. Inner baffle ring bottom 230 is then inclined inward in order to direct solids towards outlet 118. Central baffle ring bottom 240 is also inclined inward to form a funnel constricting the flow of solids in order to direct solids to outlet 118. As the number of baffle rings forming baffle assembly 123 varies so too may the number of baffle rings having an inclined bottom segment. According to an alternate embodiment of baffle assembly 123 the outer baffle ring bottom 220 may instead be turned or inclined outward, as is illustrated in FIG. 4, away from outlet 118 for the purpose of preventing or limiting the flow of solids upwards into the outer chamber or fluids flowing downwards to recombine with separated solids. By perforating the outer baffle member near its upper edge clean water at the top of the inner chambers can pass into the outermost chamber while water sitting atop the solids accumulated at the bottom neither flows nor splashes into the outermost chamber. While originally conceived as a form of splash guard for use in combination with a dip tube (not shown) to draw fluids from the outer chamber without contamination by solids drawn in near the outer baffle ring bottom 220, it is contemplated that this outer baffle member could also scrape the interior walls of tank 110 maintaining it in a clean state. With a sealing ring (of rubber or any suitable material) on the edge of said outer baffle ring bottom 220 a fit sufficiently tight could be achieved to draw fluid up to drain 160 as baffle assembly 123 is raised.

As the combination of flocculation agent concentration, slurry inflow, baffle position, fluid drain rate, and outlet suction are adjusted—optimal operating settings are achievable for a given slurry composition. However as drilling progresses through various depths in a formation, slurry composition will change to varying degrees making it advantageous to refine the settings of one or more of those variables influencing the operation of apparatus 100. Similarly, as apparatus 100 is used at different well-sites, very different settings may be optimal. Advantageously, the ease and speed of adjustment of one or more of these settings makes apparatus 100 both flexible and highly productive, by reducing downtime during both setup and adjustment.

Once the slurry level in tank 110 reaches operational capacity (for the particular installation of apparatus 100) the rate of inflow of slurry stream 135 is adjusted (together with adjustments to the flocculation agent concentration and baffle position) to maintain that operational level and a chemical balance acceptable over a range of settings. Steady-state operation is reached when just sufficient flocculation agent per unit volume of slurry is introduced into stream 135 such that substantially all of the solids are agglomerated to solid cuttings in the slurry stream by the time slurry stream 135 reaches inlet 115. Hychem Inc.'s water soluble polymers (flocculants and coagulants) have been found to perform satisfactorily with this system. Under its registered brand "hyperfloc", Hychem provides detailed directions respecting how to prepare its dry flocculants for use as a pre-mixed liquid flocculant easily injected into stream 135. However, it is contemplated that such dry flocculants may be mixed on-site using fluids from drain 160 or even converted to powder and injected at a suitable position upstream of inlet 115 directly into conduit 130 via venturi injectors at a plurality of points around the circumference of conduit 130 in order to eliminate the flocculant generation subsystem. Once in steady-state operation it is preferred to drain water from tank 110 as quickly as possible by any suitable means such as overflow, siphon, or dip tube suction. Water clarity may be determined and monitored for changes to clarity using any suitable sensor in this new application. For example, Wedgewood Technology's configurable "Solids Concentration Monitor" measures suspended solids, immiscible fluid mixtures, and dissolved solids. The device uses optical transmittance (determining the amount of light absorbed or reflected by the solids in the subject fluid body) to continually analyze the fluid mixture proximal the liquid drain to detect and measure changes in the solids content of the fluids at the periphery of the tank. Capable of measuring very small changes in solids content even at elevated concentrations such sensor and monitor packages are incorporated in the system of the present invention to permit fine-tuning of the flocculant injected using positive displacement pumps. Similarly, according to a preferred embodiment of the system of the present invention means to fine-tune inflows and outflows (optimizing operation) are required. For example, Sierra Instruments Innova-Mass multi-parameter vortex meter accurately measures streams of steam, gas, or liquids providing five process variables (Mass flow rate, Volumetric flow rate, Temperature, Pressure, and Fluid Density) from one integrated instrument having three primary sensing elements: a vortex shedding velocity sensor, an RTD temperature sensor, and a solid state pressure transducer. To inter-relate and balance the inflow of treated slurry with the outflows of separated fluids and solids, sensors providing flow information from each stream for use by a controller circuit to adjust pump and suction rates is required to implement automatic and continuous adjustment. Once in steady-state operation optimal performance is achieved by keeping the concentrating apparatus full while draining off clean water and drawing off concentrated solids carrying minimal residual water.

Although it is possible with a stable composition (of the formation being drilled) to maintain clean water over a moist mass of solids covering the outlet, in normal drilling conditions, the use of an adjustable baffle assembly reduces splashing and contamination of the water leaving tank 110 at drain 160, thereby permitting the control system more time to react to sensor data and incrementally adjust flows—rather than large flow rate swings while drain water quality recovers. Environmental quality, tool life, and fluid efficiency are all enhanced by adequately cleaning the drain water before it is re-circulated to the rig for drilling. Fewer and smaller incremental changes in flow permit a higher overall net throughput of treated slurry. Advantageously, by refining the chemical balance and drain water quality this increased net throughput results together with reduced consumption of both chemical and external feed water. When the bottoms of baffle members 120 are also positioned above the base of tank 110, using an adjustable baffle assembly 123 to dampen motion and reduce contamination of water proximal the drain has the added advantage of permitting the subsurface spread of solids up inclined bottom 117 of the conical base of tank 110 without overflowing solids from central chamber 125 into adjacent chambers by passing over the top of the baffle member forming chamber 125 and dropping to the bottom of the adjacent chamber causing undesirable waves throughout tank 110. Instead, having baffle assembly 123 position adjustment circuitry coordinated, through a hard or soft PLC (e.g. Aerotech's Automation 3200 system), with the flow circuitry of the system of the present invention—permits a further refinement in level control (solids and fluids) in order to maintain a mass of solids feeding outlet 118, while still having water floating thereover proximal the center of tank 110—but sheltering the clean, undisturbed water adjacent the periphery of tank 110 being drained, siphoned or sucked away via drain 160.

According to a preferred embodiment of the system of the present invention there is provided an intermediate chamber 320 between drain 160 and the flocculant generation (polymer mixing & feeding) sub-system 310 (e.g. Hychem's fully automated polymer mixing and feed system) to protect the clean water supply to the rig by permitting a transient interruption of drainage while contaminants detected in intermediate chamber 320 are flushed, before water flow is restored between drain 160 and sub-system 310 or the rig supply line 170.

According to a preferred embodiment of the system of the present invention centrifuges (not shown) drawing on conduit 150 creating suction at outlet 118 may be used to re-circulate fluid from tank 110 while the volume of fluid being so circulated in a closed-loop is measured. Using any suitable flow meter (not shown) for each pathway the measured volumes exiting via conduit 150 and returning via fluid return 140 are recorded, such that the volume of solids removed may be calculated as the difference between the two measures. Assuming that the flow meters selected also measure density, the mass density of the solids removed from tank 110 can be calculated. Monitoring the returning stream in fluid return 140, if the mass density exceeds 1000 kg/m$^3$ then the returning stream includes unwanted solids, which information may be used by a controlling computer to: shut-down, or raise an alarm to a human operator, or temporarily cease diverting any portion of the returning liquid stream to the rig tanks, or adjust the amount of flocculant being injected into slurry 135, or any combination of the foregoing alternative actions. Known traditional problems that lead to the returning stream in fluid return 140 becoming "dirty" include: exhaustion of the supply of polymer, and failure of the polymer pump, which can contaminate the system. Advantageously, the present invention avoids such contamination, and the downtime of the system is also significantly reduced over the life of each installation such that a low-power system actually processes significantly more slurry. If a dual purpose meter is not available, then the density may be determined by any suitable density measuring technology, including but not limited to those manufactured by the Mt. Fury Company Inc. (e.g. Model 610 Solids Concentration Monitor) or IMC Coppas Quebec Ltd. (e.g. Microwave Density Meter).

Modern centrifuges typically come with a controller panel that contemplates the use of a Programmable Logic Controller ("PLC") and a touch screen to operate it. A PLC is flexible and may be used to operate the system by running software written to control the interaction of the centrifuges with other components of the system. For example, an ultrasonic level measuring device can be tied into the PLC and a variable-speed feed pump that is used to adjust the volume in tank 110 according to preset operating parameters, whether as a fail safe against overflowing tank 110 or to facilitate optimal residence time. Ideally, since pre-flocculation is used in the system, the optimal residence time is near zero as no re-circulation is desired once chemical balance is achieved and steady-state is attained. Basically, no matter how fast slurry moves through conduit 130, exactly the same total amount leaves via outlet 118 and drain 160—with nothing returning through fluid return 140 unless fresh water is needed to offset a lack of raw slurry to process. An automated polymer mixing and feeding sub-system can also be tied into the PLC to speed or slow the polymer feed pump as required. Similarly, flow and density measuring meters can easily be interfaced with the PLC to continuously provide it with the data used to incrementally adjust all flows via the pumps and centrifuges. It has been determined that cuirent positive displacement pump technology is more accurate and better suited to use with a PLC than is the pump technology used with conventional flocculation devices. Rapid reaction times and accurate responses are useful to fine tune the system and maintain it at steady-state. For example, monitoring the interrelation of outflow to inflow also permits appropriate solids accumulation at steady state.

Any suitable feed pump may be used to transfer raw slurry from the well through the shakers and into conduit 130 for treatment. Similarly, any suitable centrifuge may be used to create suction at outlet 118 and extract residual fluids from the concentrated solids adjacent outlet 118 as well as to circulate those residual fluids whenever they are either dirty, or required to keep the system operating well.

The flow of solids along sloping bottom 117 is influenced by the angle of slope of sloping bottom 117, which angle in turn affects the shape and size of annular passage 126. Consequently, according to an alternate embodiment of apparatus 100, baffle assembly 123 may be fixed and the angle of sloping bottom 117 may instead be varied by any suitable pivot and drive means (not shown) to adjust the flow of solids across tank bottom 117. Both baffles and angle may be adjusted as well.

Figure 6:
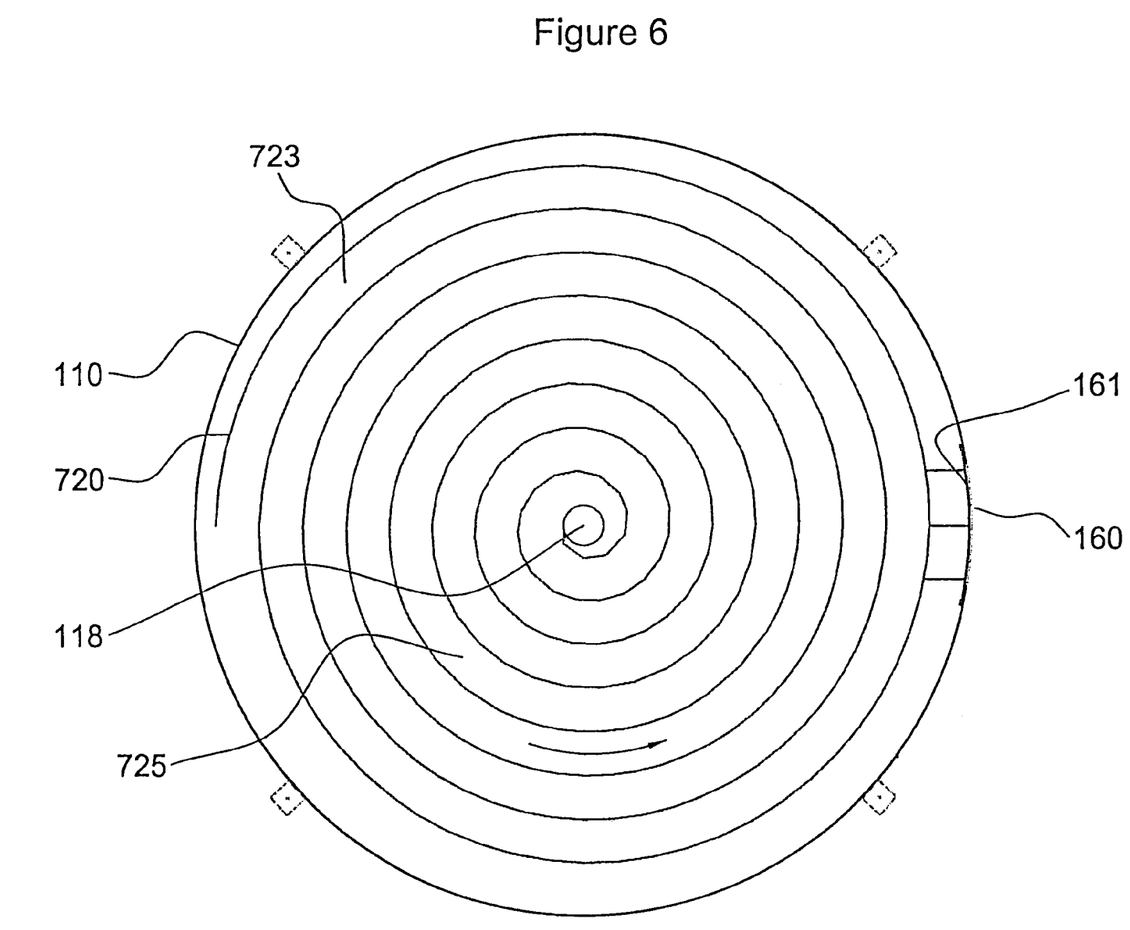
FIG. 6 is a top plan view of an alternate embodiment of the baffle assembly of the present invention in which baffles are arranged spirally.
Figure 7:
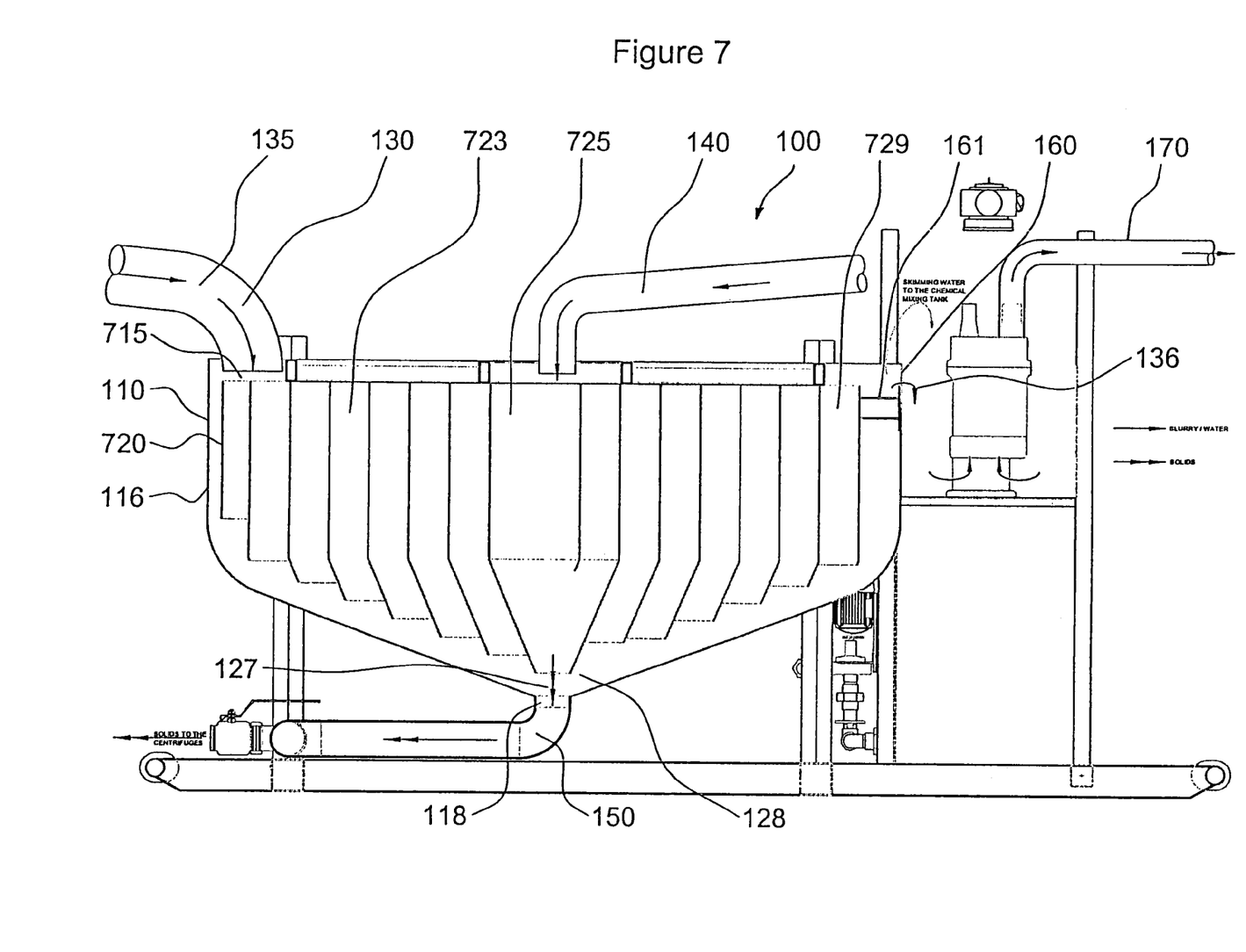
FIG. 7 is a cut-away side elevation view of an alternate embodiment of the apparatus of the present invention showing perimeter input to baffles arranged spirally.

Referring now in detail to FIGS. 6 and 7, according to an alternate embodiment of apparatus 100, baffle assembly 723 is a spiral member 720 (connected at a number of points to a frame 122) wrapped about an axis aligned with outlet 118 to form a spiral path 725, and the top of which member 720 acts as a series of baffles having an effect and purpose similar to that of baffle assembly 123. Referring to FIG. 7, feeding stream 135 into tank 110 at its outer edge (typically opposite drain 160) permits the separated solids to follow an extended path to outlet 118, which extends the residence time of solids in tank 110. Suitable for use in a system requiring greater settling time, baffle assembly 723 permits drain 160 to be centrally located and used to bleed away clear water after the operation of this embodiment of apparatus 100 reaches steady state because all of the solids separated from stream 135 will lay on the sloping bottom 117 of tank 110 enroute to outlet 118 displacing water upwards where it may exit through drain 160. In a manner and for a purpose similar to that of baffle assembly 123, baffle assembly 723 may be lowered into and raised out of tank 110.

Figure 8:
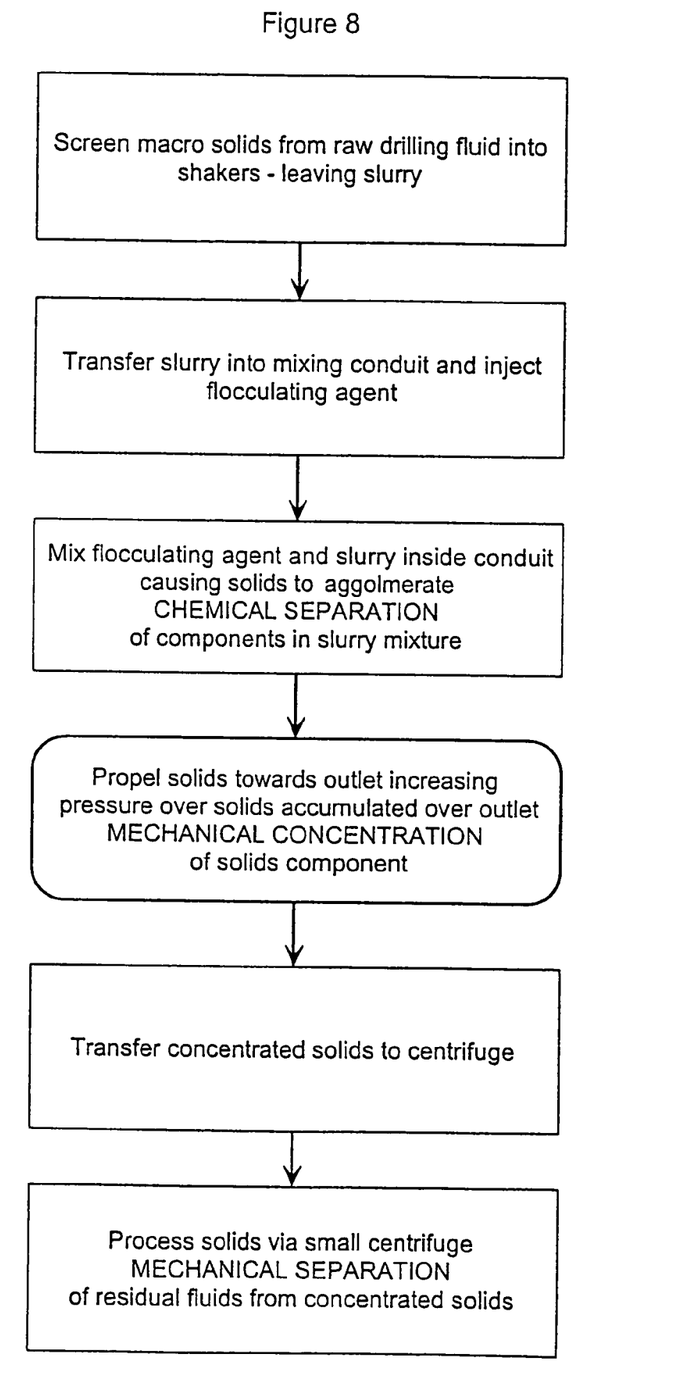
FIG. 8 is a flowchart diagram illustrating an embodiment of the method of the present invention.

FIG. 8 illustrates a preferred method according to the present invention by means of a labeled flowchart.

According to a preferred embodiment of the system of the present invention all of the components are mounted on a metal frame suitable for transport to remote work sites by truck over highway and then sliding across the ground under tow by any suitable means. To provide sufficient suction for operation the system may be connected to centrifuges already on-site, or it may have centrifuges mounted on the system frame proximal the outlet conduit.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

While particular embodiments of the present invention have been described in the foregoing, it is to be understood that other embodiments are possible within the scope of the invention and are intended to be included herein. It will be clear to any person skilled in the art of separating and concentrating solids from fluids that modifications of and adjustments to this invention, not shown, are possible without departing from the spirit of the invention as demonstrated through the preferred embodiments. The invention is therefore to be considered limited solely by the scope of the appended claims.

The invention claimed is:

1. An apparatus for removing solids from a slurry stream of fluids and agglomerated solids, the apparatus comprising:

a tank having a peripheral wall and a bottom, an inlet for supplying the slurry stream to said tank, and an outlet fluidly coupled to said bottom and substantially co-axial with and below said inlet, said outlet for receiving agglomerated slurry solids directly from said inlet;

guiding means substantially co-axial with but positioned above said outlet and between said inlet and said outlet, for guiding agglomerated solids in the slurry stream from said inlet directly to said outlet, said guiding means comprises a baffle assembly including a plurality of concentric baffles that partition said tank into a plurality of fluidly coupled chambers, to form and maintain a substantially conical mass of agglomerated solids substantially co-axial with and over said outlet; and fluid removal means for removing the fluids from said tank from a location remote from said outlet.

2. The apparatus as claimed in claim 1 wherein said bottom is substantially conical with said outlet centrally disposed therein.

3. The apparatus as claimed in claim 1, wherein said inlet comprises means for propelling said slurry stream through said inlet into said tank.

4. The apparatus as claimed in claim 1, wherein said fluid removal means comprises a drain.

5. The apparatus as claimed in claim 1, wherein said guiding means comprises a baffle assembly is suspended in said tank.

6. The apparatus as claimed in claim 5, wherein said baffle assembly is moveable, for adjusting the position of said baffle assembly within said tank.

7. The apparatus as claimed in claim 6, further comprising means for moving said baffle assembly.

8. A system for removing solids from a slurry stream comprising fluids and entrained solids, the system comprising:

agglomeration means for agglomerating the entrained solids within the slurry stream;

inlet means for introducing the slurry stream to a solids concentrating apparatus, said apparatus comprising:

a tank having a peripheral wall, a bottom, and an outlet fluidly coupled to said bottom and substantially co-axial with and below said inlet means, said outlet for receiving the agglomerated solids directly from said inlet;

guiding means substantially co-axial with but positioned above said outlet and between said inlet means and said outlet, said guiding means for guiding the agglomerated solids from said inlet directly to said outlet, said guiding means comprises a baffle assembly including a plurality of concentric baffles that partition said tank into a plurality of fluidly coupled chambers, to form and maintain a substantially conical mass of agglomerated solids substantially co-axial with and over said outlet; and drain means for removing the fluids from said tank;

sensor means for detecting the amount of each of the agglomerated solids and the fluids in said tank;

solids removal means fluidly coupled to said outlet, for withdrawing the agglomerated solids through said outlet; and separation means fluidly coupled to said solids removal means, for separating residual water from the agglomerated solids withdrawn through said outlet.

9. The system as claimed in claim 8, further comprising control means, said control means receiving input from said sensor means and regulating volumetric flow of slurry into said tank via said inlet means and/or volumetric flow of fluids out of said tank via said drain means.

10. The system as claimed in claim 8, wherein said agglomeration means comprise flocculant.

11. The system as claimed in claim 10, further comprising:

flocculant generation means fluidly coupled to said drain means, for mixing removed fluid with flocculating agent to create flocculant; and flocculant transfer means fluidly coupled to said flocculant generation means at a point upstream of said solids concentrating apparatus, for introducing said flocculant into a conduit carrying said slurry stream to said inlet means.

* * * * *